(12) United States Patent
Jin

(10) Patent No.: US 10,073,611 B2
(45) Date of Patent: Sep. 11, 2018

(54) DISPLAY APPARATUS TO DISPLAY A MIRRORING SCREEN AND CONTROLLING METHOD THEREOF

(71) Applicant: Hyundai Motor Company, Seoul (KR)

(72) Inventor: Geum Dan Jin, Seoul (KR)

(73) Assignee: HYUNDAI MOTOR COMPANY, Seoul (KR)

( * ) Notice: Subject to any disclaimer, the term of this patent is extended or adjusted under 35 U.S.C. 154(b) by 455 days.

(21) Appl. No.: 14/505,137

(22) Filed: Oct. 2, 2014

(65) Prior Publication Data

US 2015/0193114 A1    Jul. 9, 2015

(30) Foreign Application Priority Data

Jan. 6, 2014 (KR) ........................ 10-2014-0001212

(51) Int. Cl.
  *G06F 3/0488*   (2013.01)
  *G06F 3/0481*   (2013.01)
  *G06F 3/14*     (2006.01)
  *G06F 9/451*    (2018.01)

(52) U.S. Cl.
  CPC ........ *G06F 3/0488* (2013.01); *G06F 3/04817* (2013.01); *G06F 3/1423* (2013.01); *G06F 3/1454* (2013.01); *G06F 9/451* (2018.02)

(58) Field of Classification Search
  CPC ... G06F 3/0488; G06F 3/04817; G06F 3/1454
  See application file for complete search history.

(56) References Cited

U.S. PATENT DOCUMENTS

| | | | | |
|---|---|---|---|---|
| 2003/0028259 | A1* | 2/2003 | Hood | D06F 39/005 700/17 |
| 2007/0076230 | A1* | 4/2007 | Li | G06F 3/1454 358/1.2 |
| 2008/0215978 | A1* | 9/2008 | Bamba | G06F 3/0482 715/713 |
| 2009/0070404 | A1* | 3/2009 | Mazzaferri | G06F 9/542 709/202 |
| 2012/0005602 | A1* | 1/2012 | Anttila | G06F 3/1431 715/761 |
| 2012/0066419 | A1* | 3/2012 | Park | H04M 1/7253 710/62 |
| 2012/0299847 | A1 | 11/2012 | Kwon et al. | |
| 2013/0057764 | A1 | 3/2013 | Choi et al. | |

FOREIGN PATENT DOCUMENTS

| | | |
|---|---|---|
| KR | 10-2011-0059047 A | 6/2011 |
| KR | 10-2012-0039894 A | 4/2012 |
| KR | 10-2012-0084985 A | 7/2012 |
| KR | 10-2012-0132071 A | 12/2012 |
| KR | 10-2013-0025512 A | 3/2013 |
| KR | 10-2013-0094998 A | 8/2013 |

* cited by examiner

*Primary Examiner* — Li P Sun
(74) *Attorney, Agent, or Firm* — McDermott Will & Emery LLP

(57) ABSTRACT

A controlling method of a display apparatus includes: receiving an image displayed on an external terminal apparatus from the external terminal apparatus; displaying the received image in an entire region of a display screen; displaying at least one screen converting icon on the display screen; and displaying an image provided from the display apparatus on the display screen when a touch manipulation is input to the screen converting icon.

10 Claims, 6 Drawing Sheets

DISPLAY APPARATUS TO DISPLAY A MIRRORING SCREEN AND CONTROLLING METHOD THEREOF

CROSS-REFERENCE TO RELATED APPLICATION

This application is based on and claims the benefit of priority to Korean Patent Application No. 10-2014-0001212, filed on Jan. 6, 2014 in the Korean Intellectual Property Office, the disclosure of which is incorporated herein in its entirety by reference.

TECHNICAL FIELD

The present disclosure relates to a display apparatus including a screen displayed on a terminal apparatus to display a mirroring screen, and a controlling method thereof.

BACKGROUND

Recently, in accordance with the development of electronic technology, various portable terminal apparatuses such as a smart phone, a tablet personal computer (PC), and the like, have been developed. These portable terminal apparatuses have been made available to most people due to convenient portability and have found various uses in real life such as reproduction of various multimedia data including music, a photograph, a moving picture, Internet surfing, or the like.

A technology of interoperating and using the portable terminal apparatus with a display apparatus provided in a home or a vehicle has been developed. Particularly, a technology of interoperating a display screen of the portable terminal apparatus with the display apparatus to provide a mirroring screen as well as transmitting and receiving data between the portable terminal apparatus and the display apparatus has been developed.

When the display apparatus provides the mirroring screen, in a case in which an entire region of the display screen is displayed in the mirroring screen and when the display screen is touched, an input signal is transferred to the terminal apparatus, such that the terminal apparatus may be controlled. Therefore, in the case in which a separate hard key is not provided in the display apparatus, a problem may occur where it is difficult to convert the mirroring screen into an image provided from the display apparatus.

SUMMARY

The present disclosure has been made to solve the above-mentioned problems occurring in the prior art while advantages achieved by the prior art are maintained intact.

An aspect of the present disclosure provides a display apparatus capable of conveniently converting a mirroring screen into an image provided from the display apparatus. The converting occurs in a situation in which the mirroring screen is displayed as an entire screen and when a portable terminal apparatus interworks with the display apparatus to provide the mirroring screen. An aspect of the present disclosure also provides a controlling method for the display apparatus.

According to an exemplary embodiment of the present disclosure, a controlling method of a display apparatus includes: receiving an image displayed on an external terminal apparatus from the external terminal apparatus; displaying the received image in an entire region of a display screen; displaying at least one screen converting icon on the display screen; and displaying an image provided from the display apparatus on the display screen when a touch manipulation is input to the screen converting icon.

The controlling method of a display apparatus may further include: displaying a plurality of screen converting icons on the display screen when the image provided from the display apparatus is displayed depending on the touch manipulation; and displaying the image received from the external terminal apparatus in the entire region of the display screen when a touch manipulation is input to any one of the plurality of screen converting icons.

The controlling method of a display apparatus may further include displaying a screen converting icon to which the touch manipulation is input among the plurality of screen converting icons on the display screen when the image received from the external terminal apparatus is displayed in the entire region of the display screen depending on the touch manipulation.

The controlling method of a display apparatus may further include displaying the image received from the external terminal apparatus in the entire region of the display screen when a preset time elapses in a state in which the image provided from the display apparatus is displayed.

The controlling method of a display apparatus may further include displaying the screen converting icon to which the past touch manipulation has been input on the display screen, when a preset time elapses, such that the image received from the external terminal apparatus is displayed in the entire region of the display screen.

The controlling method of a display apparatus may further include: receiving a menu list including at least one menu from the external terminal apparatus; and displaying menu icons corresponding to the menu list on the display screen when the image provided from the display apparatus is displayed on the display screen.

The menu icons may be displayed at different sizes depending on the number of menus included in the menu list.

The controlling method of a display apparatus may further include transmitting an input signal for a menu icon to which a touch manipulation is input to the external terminal apparatus when the touch manipulation is input to the menu icon.

According to another exemplary embodiment of the present disclosure, a display apparatus includes: a communicating unit receiving an image displayed on an external terminal apparatus from the external terminal apparatus; and a touch screen displaying the received image in an entire region of a display screen and displaying at least one screen converting icon on the display screen, wherein the touch screen displays an image provided from the display apparatus on the display screen when a touch manipulation is input to the screen converting icon.

The touch screen may display a plurality of screen converting icons on the display screen when the image provided from the display apparatus is displayed on the display screen and may display the image received from the external terminal apparatus on the display screen when a touch manipulation is input to any one of the plurality of screen converting icons.

The touch screen may display the image received from the external terminal apparatus in the entire region of the display screen when a preset time elapses in a state in which the image provided from the display apparatus is displayed on the display screen.

The touch screen may display one screen converting icon to which the past touch manipulation has been input on the display screen when a screen converting icon to which the past touch manipulation has been input is present.

The communicating unit may receive a menu list including at least one menu from the external terminal apparatus, and the touch screen may display menu icons corresponding to the menu list on the display screen when the image provided from the display apparatus is displayed on the display screen.

The touch screen may display the menu icons at different sizes depending on the number of menus included in the menu list.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Hereinafter, the present disclosure will be described in detail with reference to the accompanying drawings.

Figure 1:
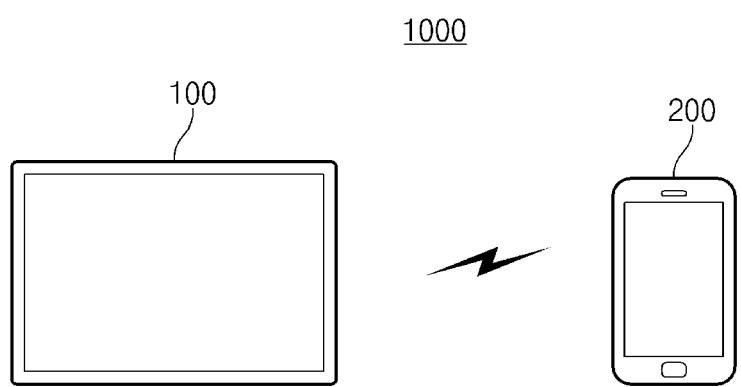
FIG. 1 is a diagram showing a display system according to an exemplary embodiment of the present disclosure.

FIG. 1 is a diagram showing a display system according to an exemplary embodiment of the present disclosure.

Referring to FIG. 1, a display system 1000 includes a display apparatus 100 and a terminal apparatus 200. The display apparatus 100 may receive an image displayed on the terminal apparatus 200 from the terminal apparatus 200 and display the received image. Therefore, the display apparatus 100 may display the same display screen (mirroring screen) as the display screen displayed on the terminal apparatus 200. To this end, the display apparatus 100 may be connected to and communicate with the terminal apparatus 200. The display apparatus 100 and the terminal apparatus 200 may communicate with each other by various wireless communication technologies including, but not limited to, Wifi, Bluetooth, infrared data association (IRDA), radio frequency (RF), near field communication (NFC), Zigbee, IEEE 802.11, and the like.

In an exemplary embodiment where the display system 1000 is applied to a vehicle, the display apparatus 100 may be implemented by an audio video navigation (AVN) mounted in the vehicle, and the terminal apparatus 200 may be implemented by a portable terminal apparatus such as a smart phone or a tablet personal computer (PC).

The display apparatus 100 may receive the image displayed on the terminal apparatus 200 from the terminal apparatus 200 and display the received image on a display screen. The display apparatus 100 may transmit a user touch manipulation to the terminal apparatus 200 when the user touch manipulation is input to a region in which the image received from the terminal apparatus 200 is displayed. In addition, the terminal apparatus 200 may perform an operation corresponding to the received touch manipulation. That is, a user may manipulate the temfinal apparatus 200 through the display apparatus 100.

In an exemplary embodiment, the display apparatus 100 may display an image provided therefrom (or an image that is not received from the terminal apparatus 200). The display apparatus 100 may display a plurality of screen converting icons on the display screen when it displays the image provided therefrom. In addition, the display apparatus 100 may display at least one screen converting icon on the display screen when it displays the image received from the terminal apparatus. The screen converting icon can be an icon capable of converting the image received from the terminal apparatus into the image provided from the display apparatus or converting the image provided from the display apparatus into the image received from the terminal apparatus.

In an exemplary embodiment, the display apparatus 100 may receive a menu list including at least one menu from the terminal apparatus 200. Additionally, the display apparatus 100 may receive menu icons from the terminal apparatus 200. The display apparatus 100 may display the menu icons corresponding to the menu list received from the terminal apparatus 200 when it displays the image provided therefrom.

The display apparatus 100 may transmit a signal to the terminal apparatus 200 when a touch manipulation is input to the menu icon, and the terminal apparatus 200 may perform an operation corresponding to the menu icon to which the touch manipulation is input.

Therefore, when the user controls the terminal apparatus 200 through the display apparatus 100, he/she may control the terminal apparatus 200 through the menu icon with respect to a function that may not be controlled by the touch manipulation for the region in which the image is displayed.

Figure 2:
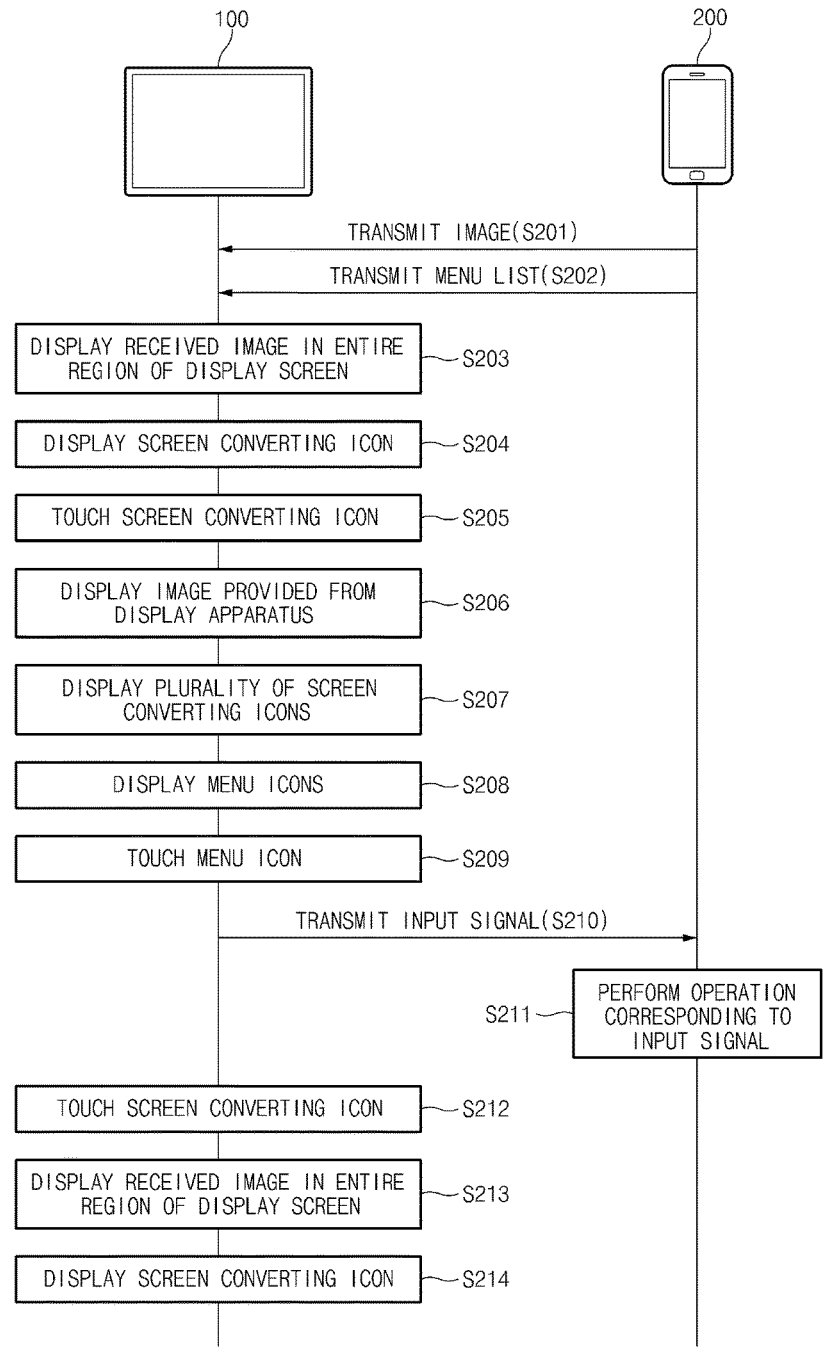
FIG. 2 is a diagram for describing a controlling method of a display system according to an exemplary embodiment of the present disclosure.

FIG. 2 is a diagram for describing a controlling method of a display system according to an exemplary embodiment of the present disclosure.

Referring to FIG. 2, the terminal apparatus 200 transmits the image to the display apparatus 100 (S201). Then, the terminal apparatus 200 may transmit the menu list including at least one menu to the display apparatus 100 (S202). In this case, the terminal apparatus 200 may also transmit the menu icons corresponding to the menu list.

When the display apparatus 100 receives the image from the terminal apparatus 200, it displays the received image in an entire region of the display screen (S203). Then, at least one screen converting icon is displayed on the display screen (S204).

When the touch manipulation is input to the screen converting icon (S205), the image provided from the display apparatus is displayed on the display screen (S206). Then, a plurality of screen converting icons are displayed on the display screen (S207). Then, the menu icons corresponding to the menu list received from the terminal apparatus 200 are displayed on the display screen (S208). In the case in which the menu icons are received from the terminal apparatus, the received menu icons may be displayed, and in the case in which the menu icons are not received, menu icons provided from the terminal apparatus may be displayed.

When the touch manipulation is input to the menu icon, the display apparatus 100 transmits an input signal for the menu icon to which the touch manipulation is input to the terminal apparatus 200 (S210). The terminal apparatus 200 may perform a corresponding operation depending on the received input signal (S211).

Then, when the touch manipulation is input to any one of the plurality of screen converting icons (S212), the display apparatus 100 may display the image received from the terminal apparatus 200 on the entire region of the display screen (S213). That is, the display apparatus 100 may convert the image displayed on the display screen whenever the user touches the screen converting icon.

Then, the screen converting icon is displayed on the display screen (S214). Here, the display apparatus may display one screen converting icon to which the touch manipulation is input. That is, the display apparatus 100 may display the plurality of screen converting icons in the case in which it displays the image provided therefrom and may display only one screen converting icon to which the touch manipulation is input in the case in which it displays the image received from the terminal apparatus on the entire screen. The display apparatus 100 may be converted from the entire screen to a partial screen or from a partial screen to the entire screen when the user touches the screen converting icon.

Figure 3:
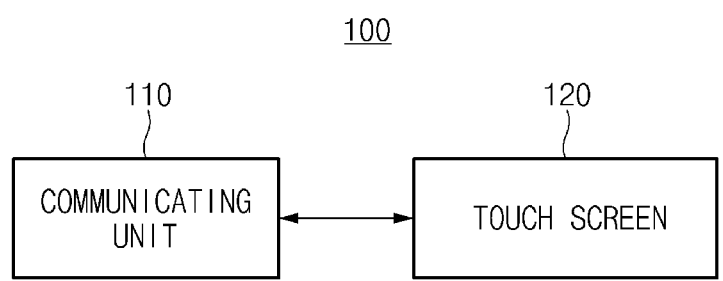
FIG. 3 is a block diagram showing a display apparatus according to an exemplary embodiment of the present disclosure.

FIG. 3 is a block diagram showing a display apparatus according to an exemplary embodiment of the present disclosure.

Referring to FIG. 3, the display apparatus 100 includes a communicating unit 110 and a touch screen 120.

The communicating unit 110 is connected to and communicates with the terminal apparatus 200. In detail, the communicating unit 110 may receive an image displayed on the terminal apparatus 200 from the terminal apparatus 200 and display the received image.

In addition, the communicating unit 110 may receive a menu list including at least one menu from the terminal apparatus 200. Further, the communicating unit 110 may receive menu icons corresponding to the menu list from the terminal apparatus 200.

The touch screen 120 may display an image received by the communicating unit 110. Particularly, the touch screen 120 may display the image received from the terminal apparatus 200 on an entire region of a display screen. In addition, the touch screen 120 may display an image provided from the display apparatus 100. The image provided from the display apparatus 100 may include may include all images except for the image provided from the terminal apparatus 200, such as an image stored in the display apparatus 100, an image received through the Internet, an image received through a broadcasting network, and the like. When the touch screen displays the image provided from the display apparatus 100, it may display the image together with various information such as the menu icon provided from the display apparatus 100, a time, and the like. In addition, the touch screen 120 may receive a touch manipulation of the user.

The touch screen 120 may display a plurality of screen switching icons on the display screen when it displays the image provided from the display apparatus on the display screen.

In an exemplary embodiment, the touch screen 120 may display the image in the entire region of the display screen when a preset event occurs in a state in which the image provided from the display apparatus is displayed. In detail, the touch screen 120 may display the image received from the terminal apparatus 200 when a touch manipulation is input to any one of the plurality of screen converting icons or when a preset time elapses in a state in which the image provided from the display apparatus is displayed.

In an exemplary embodiment, the touch screen 120 may display at least one screen converting icon on the display screen when the image received from the terminal apparatus 200 is displayed on the entire region of the display screen. The touch screen 120 may display any one of the plurality of screen switching icons on the display screen when the image provided from the display apparatus is displayed.

For example, in the case in which a touch manipulation is input to any one of the plurality of screen converting icons, such that the image received from the terminal apparatus 200 is displayed in the entire region of the display screen, the screen converting icon to which the touch manipulation is input may be displayed on the display screen. In addition, in the case in which a preset time elapses in a state in which the image is displayed in a partial region of the display screen, such that the image is displayed in the entire region of the display screen, the screen converting icon to which the touch manipulation has been input in the past may be displayed on the display screen.

In an exemplary embodiment, the touch screen 120 may display the image provided from the display apparatus 100 on the display screen when the touch manipulation is input to the screen converting icon in a state in which the image received from the terminal apparatus is displayed in the entire region of the display screen. Further, the touch screen 120 may display the menu icons corresponding to the menu list received by the communicating unit 110. In the case in which the menu icons are received from the terminal apparatus 200, the touch screen may display the received menu icons. Particularly, the touch screen 120 may display the menu icons when the image received by the communicating unit 110 is displayed in a partial region of the display screen.

In an exemplary embodiment, the touch screen 120 may display the menu icons at different sizes depending on the number of menu icons. For example, as the number of menu icons is increased, the menu icons may be displayed so as to be small, and as the number of menu icons is decreased, the menu icons may be displayed so as to be enlarged. When the touch manipulation is input to the menu icon displayed on the display screen, the communicating unit 110 may transmit a signal corresponding to the menu icon to which the touch manipulation is input to the terminal apparatus 200. In addition, the terminal apparatus 200 may perform an operation corresponding to the menu icon to which the touch manipulation is input.

A display screen of the touch screen 120 will be described in more detail with reference to FIGS. 4 and 5.

Figure 4:
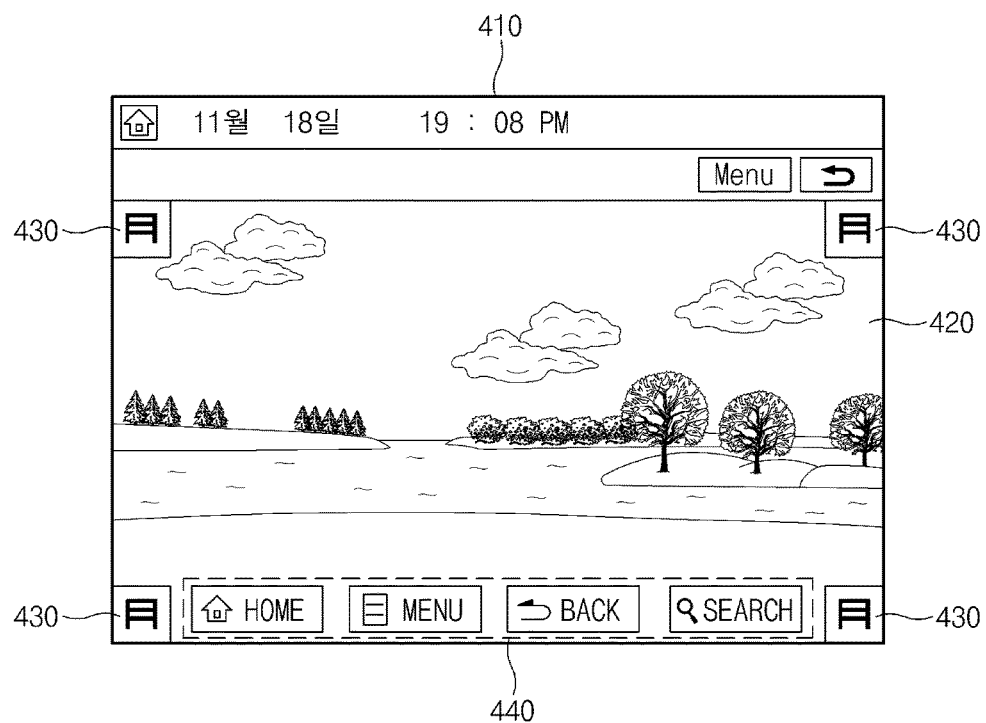
FIG. 4 is a diagram showing a display screen according to an exemplary embodiment of the present disclosure.

FIG. 4 is a diagram showing a display screen according to an exemplary embodiment of the present disclosure.

Referring to FIG. 4, an image provided from the display apparatus is displayed on a display screen 410. Information on a current state of the display apparatus 100 and various icons for controlling the display apparatus may be displayed in a region except for a region 420 in which the image is displayed in the display screen 410.

In an exemplary embodiment, a plurality of screen converting icons 430 may be displayed in the region 420 in which the image provided from the display apparatus is displayed. The plurality of screen converting icons 430 may be displayed at corners of the region 420 in which the image is displayed, respectively, as shown in FIG. 4. When a touch manipulation is input to any one of the plurality of screen converting icons, the touch screen 120 may display an image received from the terminal apparatus 200 on an entire region of the display screen.

Since a user may select and manipulate a screen converting icon that is the most conveniently manipulated among the plurality of screen converting icons at the time of converting a screen, convenience of the user may be increased. In addition, a risk of an accident that may occur since the user views the display screen for a long time in the case in which he/she drives a vehicle may be decreased.

Meanwhile, in a scenario in which a menu list including at least one menu is received from the terminal apparatus 200, the received menu list 440 may be displayed in an icon form in the region 420 in which the image is displayed. Referring to FIG. 4, the menu list may include menus such as 'HOME', 'MENU', 'BACK', 'SEARCH', and the like. In a scenario in which menu icons corresponding to the menu list are received from the terminal apparatus 200, the menu icons received from the terminal apparatus 200 may be displayed. In a scenario in which the menu icons corresponding to the menu list are not received from the terminal apparatus 200, menu icons provided from the display apparatus 100 may be displayed.

In an exemplary embodiment, sizes of the respective menu icons may be different from each other depending on the number of menu icons (or menu lists). For example, in a scenario in which five menu icons are displayed, the respective menu icons may be displayed at sizes smaller than those of the menu icons shown in FIG. 4. Alternatively, in a scenario in which three menu icons are displayed, the respective menu icons may be displayed at sizes larger than those of the menu icons shown in FIG. 4. The display apparatus 100 displays the menu list received from the terminal apparatus 200, such that the user may control the terminal apparatus 200 to perform various functions that may not be controlled through the display screen.

Figure 5:
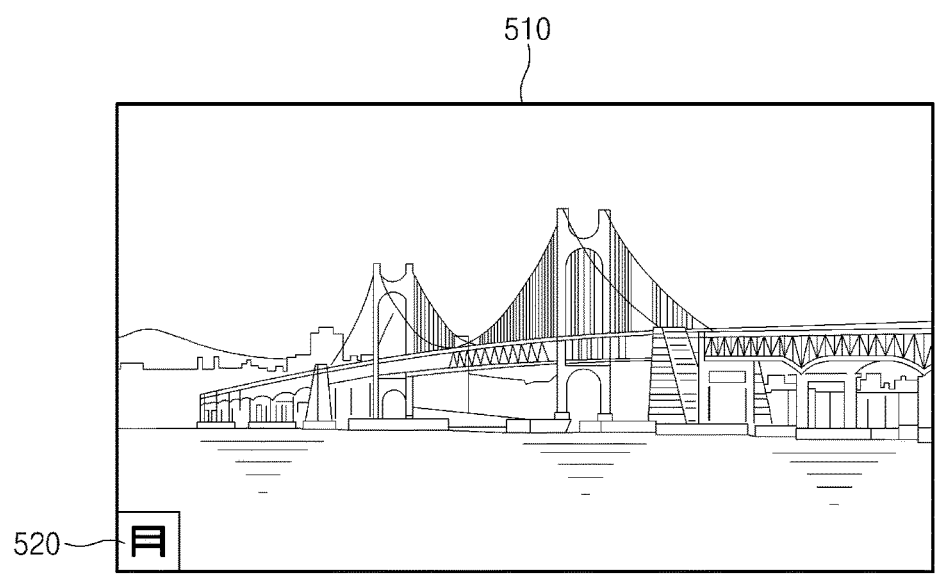
FIG. 5 is a diagram for describing a display screen according to another exemplary embodiment of the present disclosure.

FIG. 5 is a diagram for describing a display screen according to another exemplary embodiment of the present disclosure.

Referring to FIG. 5, an image received from the terminal apparatus 200 is displayed in an entire region of a display screen 510. When the user inputs the touch manipulation to any one of the plurality of screen converting icons on the display screen as shown in FIG. 4, the screen of FIG. 4 may be converted into an entire screen displaying the image received from the terminal apparatus 200 as shown in FIG. 5.

When the image is displayed as the entire screen, one screen converting icon 520 may be displayed on the display screen 510. Since an object of the entire screen is to provide the image in an optimal environment, only one screen converting icon 520 may be displayed in order to minimize screen hiding.

When a touch manipulation is input to the display screen 510, the communicating unit 110 may transmit coordinate information of the touch manipulation to the terminal apparatus 200. The terminal apparatus 200 may receive the coordinate information to perform an operation corresponding to the touch manipulation.

In addition, when a touch manipulation is input to the screen converting icon 520, the entire screen of FIG. 5 may return to the display screen displaying the image provided from the display apparatus 100 as shown in FIG. 4. That is, even in the case in which the image received from the terminal apparatus is displayed as the entire screen, the entire screen may be converted into the screen provided from the display apparatus 100 using the screen converting icon.

Figure 6:
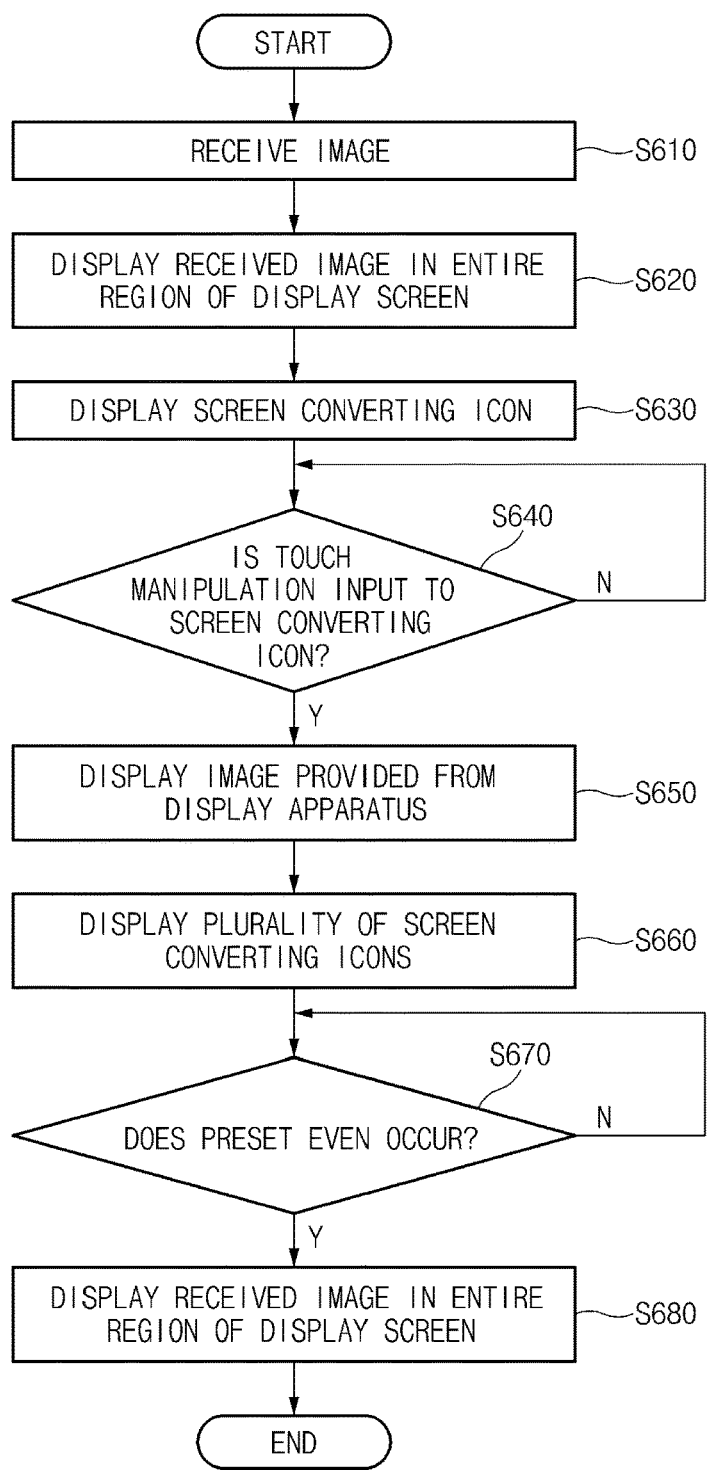
FIG. 6 is a flow chart for describing a controlling method of a display apparatus according to an exemplary embodiment of the present disclosure.

FIG. 6 is a flow chart for describing a controlling method of a display apparatus according to an exemplary embodiment of the present disclosure.

Referring to FIG. 6, the display apparatus 100 may receive an image displayed on the terminal apparatus 200 from the terminal apparatus 200 (S610). The display apparatus 100 may receive a menu list including at least one menu as well as the image. In addition, the display apparatus may also receive menu icons corresponding to the menu list.

Then, the image received from the terminal apparatus 200 is displayed in an entire region of a display screen (S620). Then, a screen converting icon is displayed on the display screen (S630).

Then, it is determined whether or not a touch manipulation has been input to the screen converting icon (S640). When the touch manipulation is input to the screen converting icon (S640—Y), the image provided from the display apparatus 100 is displayed on the display screen (S650).

Meanwhile, the display apparatus 100 may display menu icons corresponding to a received menu list on the display screen when an image provided from the display apparatus is displayed, in the case in which the menu list including at least one menu and the menu icons corresponding to the menu list are received from the terminal apparatus 200. In addition, in the case in which the menu icons corresponding to the menu list are not received, menu icons provided from the display apparatus may be displayed.

In an exemplary embodiment, the display apparatus 100 may display the menu icons at different sizes depending on the number of menu icons when it displays the menu icons. For example, as the number of menu icons is increased, the menu icons may be displayed so as to be small, and as the number of menu icons is decreased, the menu icons may be displayed so as to be large.

In an exemplary embodiment, when a touch manipulation is input to the menu icon, an input signal for the menu icon to which the touch manipulation is input may be transmitted to the terminal apparatus 200. Then, a plurality of screen converting icons are displayed on the display screen (S660).

It is then determined that a preset event has occurred (S670). Particularly, the display apparatus 100 may judge whether the touch manipulation has been input to any one of the plurality of screen converting icons or a preset time has elapsed in a state in which the image provided from the display apparatus 100 is displayed on the display screen.

When the preset event occurs (S670—Y), the image received from the terminal apparatus 200 is displayed in an entire region of the display screen (S680). In this case, only one screen converting icon may be displayed on the display screen. For example, in Step S670, in the case in which a touch manipulation is input to any one of the plurality of screen converting icons, such that the image received from the terminal apparatus 200 is displayed, the screen converting icon to which the touch manipulation is input may be displayed on the display screen. In addition, in the case in which a preset time elapses in a state in which the image is displayed in a partial region of the display screen, such that the image is displayed in the entire region of the display screen, the screen converting icon to which the touch manipulation has been input in the past may be displayed on the display screen.

According to various exemplary embodiments of the present disclosure, the user may conveniently convert a mirroring screen into the image provided from the display apparatus using the screen converting icon when the mirroring screen displayed on the display apparatus is provided.

In addition, since the user may select and manipulate a screen converting icon that is most conveniently manipulated among the plurality of screen converting icons, convenience of the user may be increased. In addition, a risk of an accident that may occur since the user views the display screen for a long time in the case in which he/she drives a vehicle may be decreased. When the image provided from the display apparatus is displayed, the user may control the terminal apparatus using the menu list displayed on the display screen.

Although exemplary embodiments of the present disclosure have been shown and described hereinabove, the present disclosure is not limited to specific exemplary embodiments described above, but may be various modified by those skilled in the art to which the present disclosure pertains without departing from the scope and spirit of the present disclosure as disclosed in the accompanying claims. In addition, such modifications should also be understood to fall within the scope and spirit of the present disclosure.

What is claimed is:

1. A controlling method of a display apparatus, comprising:
   receiving, by the display apparatus, an image displayed on an external terminal apparatus from the external terminal apparatus;
   displaying the received image in an entire region of a display screen of the display apparatus;
   displaying a screen converting icon on the display screen concurrently with the received image;
   displaying an image provided from the display apparatus and a plurality of identical screen converting icons on the display screen when a touch manipulation is input to the screen converting icon;
   detecting, by the display apparatus, an occurrence of a preset event;
   when the occurrence of the preset event is a touch manipulation input to any one of the plurality of identical screen converting icons, re-displaying the imaqe received from the external terminal apparatus in the entire region of the display screen concurrently with only the unchanged one of the plurality of identical screen converting icons receiving the touch manipulation input;
   when the occurrence of the preset event is an elapsing of a preset time in a state in which the image provided from the display apparatus is displayed, re-displaying the image received from the external terminal apparatus in the entire region of the display screen concurrently with one of the plurality of identical screen converting icons.

2. The controlling method of a display apparatus according to claim 1, further comprising:
   displaying the plurality of identical screen converting icons on the display screen when the image provided from the display apparatus is displayed depending on the touch manipulation; and
   displaying the image received from the external terminal apparatus in the entire region of the display screen when a touch manipulation is input to any one of the plurality of identical screen converting icons.

3. The controlling method of a display apparatus according to claim 2, further comprising:
   displaying the screen converting icon to which the touch manipulation is input among the plurality of identical screen converting icons on the display screen when the image received from the external terminal apparatus is displayed in the entire region of the display screen depending on the touch manipulation.

4. The controlling method of a display apparatus according to claim 1, further comprising:
   receiving a menu list including at least one menu from the external terminal apparatus; and
   displaying menu icons corresponding to the menu list on the display screen when the image provided from the display apparatus is displayed on the display screen.

5. The controlling method of a display apparatus according to claim 4, wherein the menu icons are displayed at different sizes depending on the number of menus included in the menu list.

6. The controlling method of a display apparatus according to claim 4, further comprising:
   transmitting an input signal for a menu icon to which a touch manipulation is input to the external terminal apparatus when the touch manipulation is input to the menu icon.

7. A display apparatus comprising:
   a communicating processor receiving an image displayed on an external terminal apparatus from the external terminal apparatus; and
   a touch screen displaying the received image in an entire region of a display screen of the display apparatus and displaying a screen converting icon on the display screen concurrently with the received image,
   wherein the touch screen is further configured to displaying an image provided from the display apparatus and a plurality of identical screen converting icons on the display screen when a touch manipulation is input to the screen converting icon; and
   wherein the communicating processor is further configured to detect an occurrence of a preset event;
   when the occurrence of the preset event is a touch manipulation input to any one of the plurality of identical screen converting icons, re-displaying the image received from the external terminal apparatus in the entire region of the display screen concurrently with only the unchanged one of the plurality of identical screen converting icons receiving the touch manipulation input;
   when the occurrence of the preset event is an elapsing of a preset time in a state in which the image provided from the display apparatus is displayed, re-displaying the image received from the external terminal apparatus in the entire region of the display screen concurrently with one of the plurality of identical screen converting icons.

8. The display apparatus according to claim 7, wherein the touch screen displays the plurality of identical screen converting icons on the display screen when the image provided from the display apparatus is displayed on the display screen and displays the image received from the external terminal apparatus on the display screen when a touch manipulation is input to any one of the plurality of identical screen converting icons.

9. The display apparatus according to claim 7, wherein the communicating processor receives a menu list including at least one menu from the external terminal apparatus, and the touch screen displays menu icons corresponding to the menu list on the display screen when the image provided from the display apparatus is displayed on the display screen.

10. The display apparatus according to claim 9, wherein the touch screen displays the menu icons at different sizes depending on the number of menus included in the menu list.

* * * * *